(12) United States Patent
Van den Berghe

(10) Patent No.: US 8,009,837 B2
(45) Date of Patent: Aug. 30, 2011

(54) MULTI-CHANNEL COMPATIBLE STEREO RECORDING

(75) Inventor: Guido Van den Berghe, Sint-Amands (BE)

(73) Assignee: Auro Technologies NV, Mol (BE)

( * ) Notice: Subject to any disclaimer, the term of this patent is extended or adjusted under 35 U.S.C. 154(b) by 1675 days.

(21) Appl. No.: 11/116,216

(22) Filed: Apr. 28, 2005

(65) Prior Publication Data

US 2005/0259828 A1    Nov. 24, 2005

Related U.S. Application Data

(60) Provisional application No. 60/567,041, filed on Apr. 30, 2004.

(51) Int. Cl.
*H04R 5/00* (2006.01)
*H04B 1/00* (2006.01)
*H04B 1/20* (2006.01)
*G06F 17/00* (2006.01)

(52) U.S. Cl. ............... 381/22; 381/119; 700/94; 369/4

(58) Field of Classification Search ............ 381/119, 381/11, 12, 22, 23; 700/94; 369/4, 1, 2, 369/3; 84/603, 645; 434/307 A
See application file for complete search history.

(56) References Cited

U.S. PATENT DOCUMENTS

| | | | |
|---|---|---|---|
| 4,876,719 A | 10/1989 | Nakagami et al. | |
| 5,400,433 A | 3/1995 | Davis et al. | |
| 5,796,844 A * | 8/1998 | Griesinger | 381/18 |
| 5,852,800 A | 12/1998 | Modeste et al. | |
| 5,862,228 A | 1/1999 | Davis | |
| 6,055,502 A * | 4/2000 | Kitamura | 704/500 |
| 6,405,163 B1 | 6/2002 | Laroche | |
| 2003/0002683 A1 | 1/2003 | Vaudrey et al. | |
| 2006/0098827 A1 * | 5/2006 | Paddock et al. | 381/106 |

FOREIGN PATENT DOCUMENTS

| | | |
|---|---|---|
| EP | 0 757 506 | 2/1997 |
| EP | 0757506 A2 | 2/1997 |
| WO | WO 2005/003927 | 1/2005 |

OTHER PUBLICATIONS

Faller et al., "Binaural Cue Coding Applied to Stereo and Multi-Channel Audio Compression," Audio Engineering Society Convention Paper 5574, May 2002.

(Continued)

*Primary Examiner* — Vivian Chin
*Assistant Examiner* — Kile Blair
(74) *Attorney, Agent, or Firm* — Bacon & Thomas, PLLC

(57) ABSTRACT

An encoder for mixing a plurality of independent mono audio channels into a stereo recording and generating a restricted set of additional parameters used to master an audio track of a storage device is described. The plurality of independent mono audio channels are constructed such that the storage device can be played using an optical disk player so that in a first mode all of the plurality of independent mono audio channels are played as the stereo recording and in a second mode at least one of the plurality of independent mono audio channels can be unmixed and the stereo recording played with at least one mono audio channel removed. A corresponding decoder and an audio system comprising such encoder and decoder are also described.

23 Claims, 5 Drawing Sheets

OTHER PUBLICATIONS

Kate, "Compatibility Matrixing of Multichannel Bit-Rate-Reduced Audio Signals," Philips Research Laboratories, Journal Audio Engineering Society, vol. 12, No. 12, Dec. 1995.

Office Action dated Mar. 5, 2010, received in corresponding European Patent Application No. 05009434.1.

European Search Report dated May 16, 2011 in corresponding European Application No. 10183793.

European Search Report dated May 20, 2011 in corresponding European Application No. 10183788.

\* cited by examiner

| Parameter | Standard Midi Data | CD+G(w) Midi Data | Compare |
|---|---|---|---|
| Effective (Byte)-rate | 3125 | 1275 | 60% less |
| Timing precision | 1msec | 272usecs | 4x better |
| Velocity resolution | 128 levels | 256 levels | 2x better |

MULTI-CHANNEL COMPATIBLE STEREO RECORDING

TECHNICAL FIELD OF THE INVENTION

The present invention relates to data storage formatting techniques, e.g. for solid state or optical disk such as DVD (Digital Versatile Disk). More particularly the present invention will be described with reference to the CD audio format, a consumer electronics format for prerecorded music on compact disc, of CD+G(w) but it is not limited to this form of recording. This CD audio format may, for example, be CD-DA (Compact Disc Digital Audio, the original music CD format, storing audio information as digital pulse code modulated PCM data) Redbook compatible, and may use the CD+G user mode to store additional data. CD+G(w) is an encoding and decoding technique useful for but not limited to Sing & Play-Along features like karaoke and automated instrument playback, using Multi-Channel Compatible Stereo recording.

BACKGROUND OF THE INVENTION

Generally, the existing CD+G is an audio CD format, which has limited capabilities to store additional graphics data and is mostly used in karaoke applications. The audio part of CD+G is playable on any standard Audio CD. For displaying graphics, a CDG player, a special CD player with TV output, is required, e.g. a karaoke CD player. In the CD+G format, audio data is recorded in a program area, while additional data can be stored in a program management area, which is divided into eight sub-code channels, channels P to W. The P-channel indicates the start and end of each track by toggling between 0 and 1. The Q-channel contains time-codes and a table of contents Further additional data contained in the sub-code channels R to W, may allow graphics and text to be displayed while music is being played, as used e.g. for representing still pictures or for representing letters e.g. for karaoke.

The CD+G standard defines different modes of CD+G, which are the ZERO, GRAPHICS (karaoke), MIDI and USER mode:
 ZERO mode is a mode in which no operation is done on a display screen.
 GRAPHICS mode allows to represent pictures or symbols, e.g. for karaoke.
 MIDI mode provides a 3.125 kb/s maximum data channel for the Musical Instrument Digital Interface (MIDI) data as specified by the International MIDI Association.
 USER mode is intended for professional applications. The meaning of the data is application specific.

SUMMARY OF THE INVENTION

It is an object of the present invention to provide an improved audio system.

The above objective is accomplished by a method and device according to the present invention.

Particular and preferred aspects of the invention are set out in the accompanying independent and dependent claims. Features from the dependent claims may be combined with features of the independent claims and with features of other dependent claims as appropriate and not merely as explicitly set out in the claims.

In a first aspect, the present invention provides an encoder for mixing a plurality of independent mono audio channels into a stereo recording and generating a restricted set of additional parameters used to master an audio track of a storage device, the plurality of independent mono audio channels being constructed such that the storage device can be played using an optical disk player so that in a first mode all of the plurality of independent mono audio channels are played as the stereo recording and in a second mode at least one of the plurality of independent mono audio channels can be unmixed and the stereo recording played with at least one mono audio channel removed.

The storage device may be an optical disk, such as e.g. a CD-Digital Audio Disc.

In an encoder according to an embodiment of the present invention, preferably the restricted set of additional parameters do not exceed the data size available as sub-code data within the CD+G USER mode.

In a second aspect, the present invention provides a decoder for reconstructing, in a first mode, a plurality of independent mono audio channels in a stereo recording using a restricted set of additional parameters used to master an audio track of a storage device, when reading only the audio stereo recording and the additional parameters from the storage device and in a second mode at least one of the plurality of independent mono audio channels can be unmixed and the stereo recording played with the at least one audio channel removed and not played.

The reconstructed channels may be uncorrelated, and perceptually substantially identical to the original mono channels.

In a decoder according to an embodiment of the present invention, the restricted set of additional parameters and associated mixing, panning and/or attenuation data may provide sufficient information to the decoder, to isolate, remove or attenuate a single or more mono channels during real-time playback.

In a third aspect, the present invention provides an audio system comprising an encoder according to an embodiment of the present invention and a decoder according to an embodiment of the present invention.

In an audio system according to an embodiment of the present invention, the system supports different Audio Configurations or Applications, including (Stereo) Soloist Filtering, (Mono) Vocal and (Mono) Instrument Soloist Filtering, TRUE quadraphonic audio reproduction.

Furthermore, when used in a karaoke application, the lyrics information may be included on the storage device, in a format such that it can be displayed on a display screen. When used with Player-Instrument application, the Lead Instrument may be filtered from the audio and replaced by a controlled player instrument, where control data is a part of the sub-code data on the storage device. A combination of both the Karaoke application and the Player-Instrument application may be provided.

Also additional audio filter data to improve time-stretching and/or pitch shifting may be included on the storage device.

When used in surround audio applications, the decoder may be capable of reconstructing the rear stereo audio channels fully isolated from the front stereo channels, from a TRUE quadraphonic encoded storage device. When used in surround audio applications, the decoder may be capable of dynamically panning the (Mono) Lead Vocal AND/OR (Mono) Lead Instrument from a Karaoke encoded storage device optical disk within the 3D audio space, to reproduce the effect of a live performance where the artist is moving on the stage.

Midi data may be integrated on the storage device. The audio system may have a timing precision of 272 μsecs per Midi event, as well as a midi velocity resolution of 256 different levels.

In an audio system according to embodiments of the present invention, the decoder may have means for executing the inverse operation of the encoder and both decoder and encode may be implemented in 32 bit integer arithmetic, being independent of floating point implementation. The encoder may first generate approximated audio channels prior to mixing these channels, using audio filter parameters generated as floating point values first, which are results from optimization with user configurable targets, which may include perceptual audio characteristics. The audio system may further comprise conversion to integer arithmetic, the encoder and/or decoder having means to compensate for rounding and conversion errors as to provide a decoder process which is the inverse operation of encoding.

In an audio system according to embodiments of the present invention, audio filter parameters required by the decoder and which are a part of the Data Parameter set, may be regenerated for every time period which is short compared to the audio resolution of the human ear. The time period may be 40 msecs of audio.

In an audio system according to embodiments of the present invention, the encoder may incorporate a dynamic compressor which prevents overshoots when mixing and/or encoding the plurality of mono channels into a down-mixed stereo channel.

In a further aspect, the present invention provides an encoder for mixing a plurality of independent mono audio channels into a stereo recording and generating a restricted set of additional parameters used to master an audio track of a storage device, each audio channel comprising a first number of samples per unit time, the plurality of independent mono audio channels being stored on the storage device as less than the number of samples per unit time from each audio channel with the addition of calculated values, calculated using an interpolating filter with filter parameters, for intermediate samples, the calculated intermediate samples approximating the intermediate samples of the audio channels, the filter parameters being stored on the storage device in the additional parameters.

In still a further aspect, the present invention provides a decoder for decoding a plurality of recorded mono audio channels in a stereo recording using a restricted set of additional parameters for mastering an audio track of a storage device, each audio channel being reconstructed from a first number of samples per unit time, the plurality of mono audio channels being stored on the storage device as less than the number of samples per unit time from each audio channel with the addition of calculated values, calculated using an interpolating filter with filter parameters, for intermediate samples, the calculated intermediate samples approximating the intermediate samples of the audio channels, the filter parameters being stored on the storage device in the additional parameters.

In yet a further aspect, the present invention provides a storage device having stored thereon a plurality of recorded mono audio channels in a stereo recording using a restricted set of additional parameters for mastering an audio track of the storage device, each audio channel being reconstructable from a first number of samples per unit time, the plurality of mono audio channels being stored on the storage device as less than the number of samples per unit time from each audio channel with the addition of calculated values, calculated using an interpolating filter with filter parameters, for intermediate samples, the calculated intermediate samples approximating the intermediate samples of the audio channels, the filter parameters being stored on the storage device in the additional parameters.

The CD+G(w) format which may be used with the present invention uses the USER mode of the CD+G standard to store additional data. One part of this data, the filter data section, defines several audio filter parameters. Another part, the midi data section, defines data used for midi compatible devices. Lyrics for sing-along may be integrated within the midi section of the data.

In one aspect of the present invention the audio filter data section contains audio filter parameters which enable a CD+G(w) decoder to filter individual tracks such as the lead vocal AND/OR a solo instrument out of the stereo audio recording. As the combined audio stereo recording is filtered, the amount of extra data needed to store the stereo recording is not significantly greater than is used to store the stereo recording using standard parameters. The midi data section contains data to control digital (midi) controlled devices, like digital pianos or player pianos or other midi controlled musical instruments, midi controller light equipment, or virtually anything what is midi compatible.

In another aspect of the present invention the audio filter data section is the result of a complex encoding scheme as well as a re-mastering of the original master-track recordings from the master audio recordings. The CD+G(w) decoder is capable of isolating or removing 1 or 2 or more 'lead tracks' which were mixed into the stereo re-mastered down-mix, without the need of storing these 'lead tracks' separately on the CD. In combination with Lyrics TV output and or midi capable devices, like e.g. automated musical instruments, this CD+G(w) format is one unique CD format and solution to several different features: like Karaoke or Sing-along when the lead-vocal track is filtered/removed from the stereo mix, or play-along when a lead-instrument track is filtered/removed, or even automated play-along & sing-along, when the lead-vocal & lead-instrument parts are filtered/removed and midi data is used to display Lyrics as well as to control an automated player instrument. When both lead-vocal and lead-instrument are removed, the stereo backing vocals/instruments are still audible, without any artifacts. Next to these features, TRUE quadraphonic audio CD-DA compatible audio recording becomes a reality, since the basic nature of this format and its recording and encoding mastering scheme enables to record and down-mix FOUR independent mono audio tracks into 1 stereo recording, as well as to enable an un-mix operation.

In another aspect of the present invention, a multi-channel recording technique is provided, preferably a multi-channel audio CD recording technique, for recording into a mixed channel a plurality of mono channels each having an original sampling rate, wherein, before mixing, each mono channel is redefined using at most half of its original sampling rate and a limited set of extra parameters. The recording technique according to this aspect of the present invention allows, during playback of the recorded tracks, to obtain 100% of channel filtering, i.e. in a first mode all of the plurality of independent mono (audio) channels may be played as a stereo recording and in a second mode at least one of the plurality of independent mono (audio) channels can be unmixed and the stereo recording played with at least one mono (audio) channel removed. The sampling rate of the redefined mono channels depends on the number of channels to be mixed, i.e. it is half of the original sampling rate of the mono channels if two mono channels are to be mixed, or it is a quarter of the original mono channel sampling rate if four channels are to be mixed, etc. As an example only, if two 16-bit mono channels with a sampling rate of 44 kHz are to be mixed, according to the present aspect of the invention these mono channels are redefined as two 15-bit mono channels with a sampling rate of 22 kHz, and these redefined mono channels are mixed. The redefining of the 16-bit mono channels may be performed by taking, from the first channel only the even samples, and by taking from the second channel only the odd samples. As another example, if four 16-bit mono channels each with a sampling rate of 44 kHz are to be mixed, the mono channels may be redefined as four 14-bit channels each with a sampling rate of 11 kHz, and these four redefined mono channels may be mixed. The redefining of the 16-bit mono channels may be performed by taking from the first channel every $4k^{th}$ sample, from the second channel every $(4k+1)^{th}$ sample, from the third channel every $(4k+2)^{th}$ sample, and from the fourth channel every $(4k+3)^{th}$ sample.

In a further aspect of the present invention, an almost equivalent mono channel may be obtained from the redefined mono channel and the limited set of additional parameters, for example by interpolating samples which have been discarded during the redefining process. This means that from the recorded redefined mono channels, e.g. two 15-bit mono channels with a sampling rate of 22 kHz or four 14-bit mono channels with a sampling rate of 11 kHz, together with the set of supplementary parameters, approximated original 16-bit mono channels having a sampling rate of 44 kHz can be obtained.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DESCRIPTION OF ILLUSTRATIVE EMBODIMENTS

Figure 1:
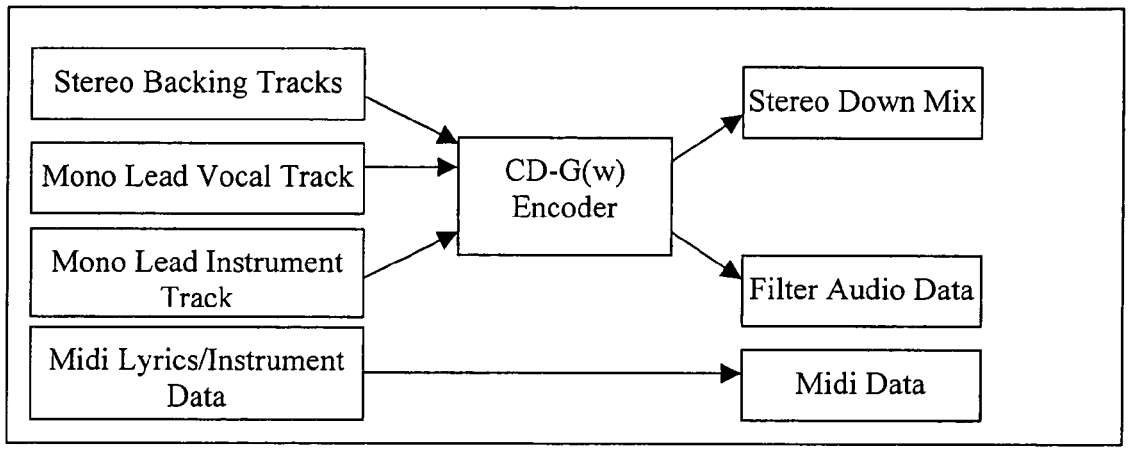
FIG. 1 illustrates a processing flow for audio encoding for applications according to a first embodiment of the present invention.
Figure 2:
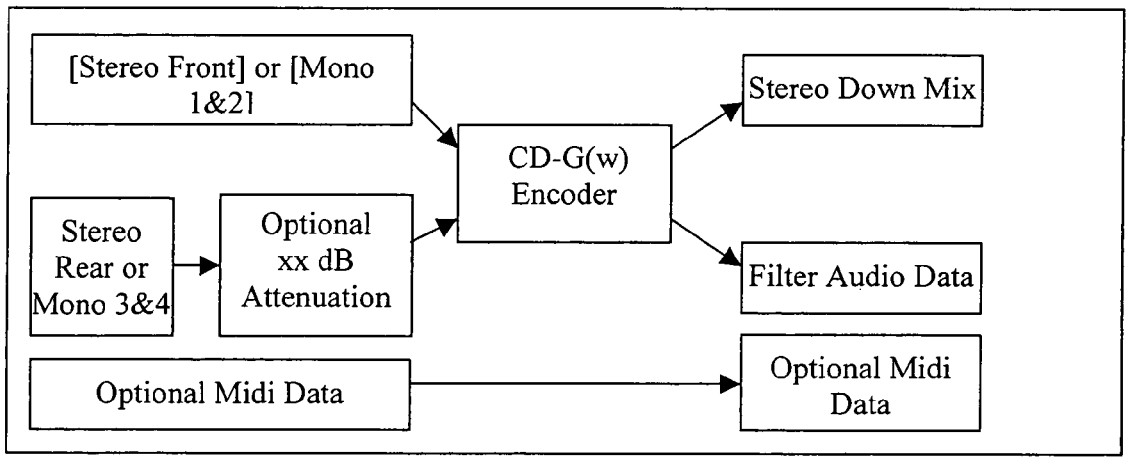
FIG. 2 illustrates a processing flow for true quadraphonic audio recording according to a second embodiment of the present invention.
Figure 3:
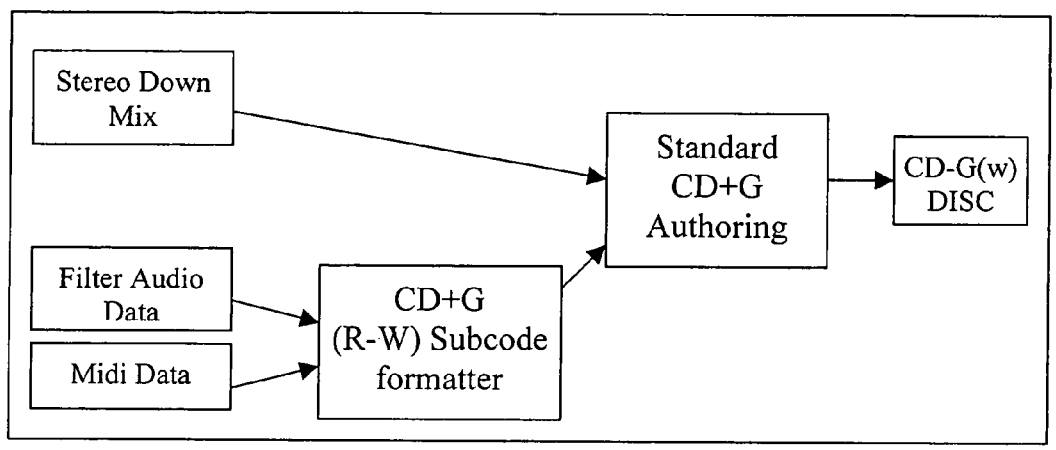
FIG. 3 illustrates CD+G(w) authoring.

The present invention will be described with respect to particular embodiments and with reference to certain drawings but the invention is not limited thereto but only by the claims. The drawings described are only schematic and are non-limiting.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

In one aspect, the present invention proposes multi-channel audio encoding & decoding.

1. Basic Principle.

The present aspect of the present invention relates to encoding of a plurality of channels into a mixed audio signal so that the original audio streams can be reconstructed from the mixed audio signal, and decoding of at least one of the plurality of channels from the mixed audio signal.

One example of the present invention is described with reference to 4-channel encoding and decoding but the present invention is not limited thereto. The more channels are recorded, the more samples have to be calculated using a filter and the lower the quality of the reproduced music may be, but in some applications music quality is not of prime importance. The encoding format of the present invention is based on mixing of 2 or more digital audio streams in such a way that the original audio streams can be reconstructed from the mixed audio signal.

As an example to illustrate this, there is started from 2 mono 44.1 kHz 16 bit digital audio streams, A & B.

In mixing two audio signals, an approximation technique is used.

Pulse Code Modulation (PCM) is used to sample analog audio into digital code, typically at 8000 samples/sec. The digital audio string is then referred to as a PCM stream.

Figure 4:
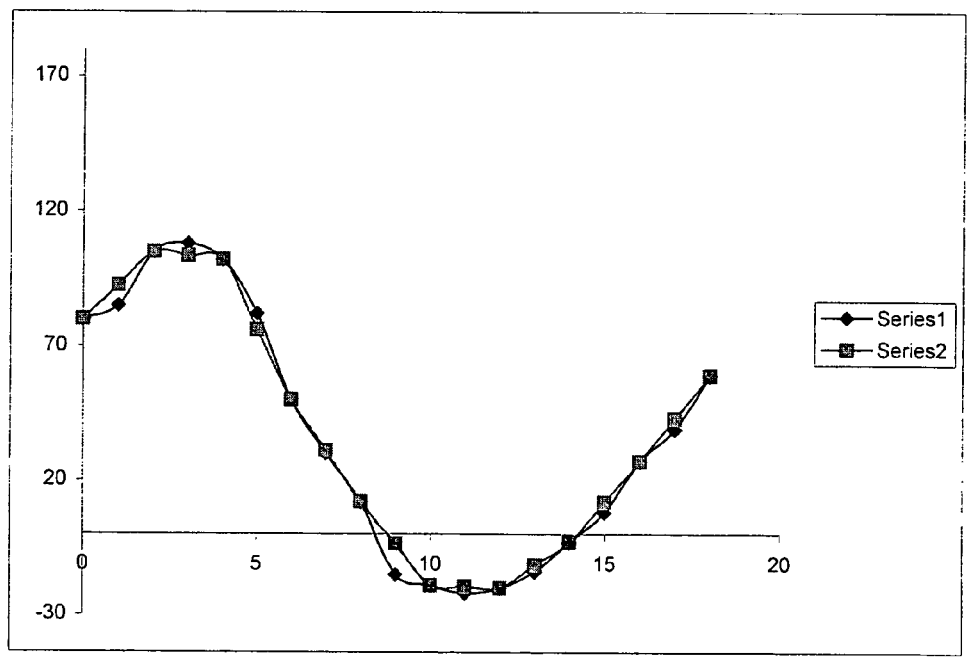
FIG. 4 illustrates a first audio stream A (series 1) and an approximated audio stream A' (series 2).

In FIG. 4, a first PCM audio stream A is shown in the graph as a dark gray line (series 1). Samples of first audio stream A are: $A_0, A_1, A_2, A_3, A_4, A_5, \ldots$. From this sample series, a new stream A' is generated (light gray, series 2). The new stream A' is an approximation of the first audio stream A, using linear interpolation to approximate the odd samples of the newly generated stream A', while copying the even samples. Samples of stream A' are: $A'_0, A'_1, A'_2, \ldots$ with $A'_{2i}=A_{2i}$ & $A'_{2i+1}=(A'_{2i}+A'_{2i+2})/2$. All even samples of the newly generated sample series are thus identical to the original data and all odd samples are defined as the linear interpolation of the next and previous sample.

Figure 5:
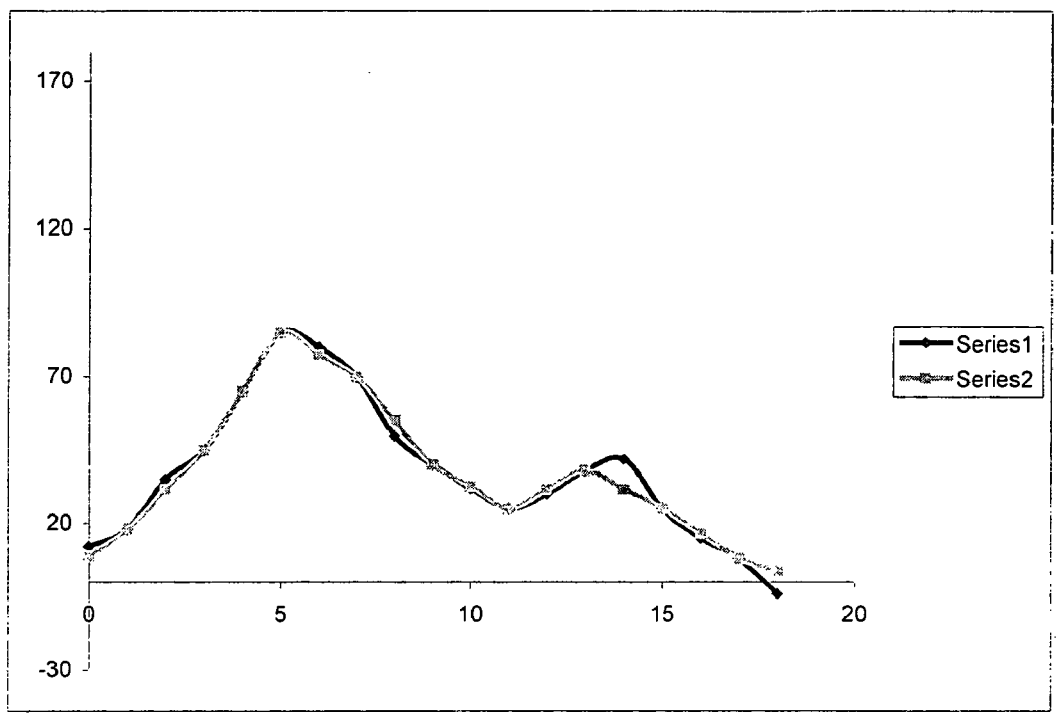
FIG. 5 illustrates a second audio stream B (series 1) and an approximated audio stream B' (series 2).

In FIG. 5, a second PCM audio stream B is shown in the graph as a dark gray line (series 1). Samples of second audio stream B are: $B_0, B_1, B_2, B_3, B_4, B_5, \ldots$. From this sample series, a new stream B' is generated (light gray, series 2). The new stream B' is an approximation of the second audio stream B, using linear interpolation to approximate the even samples of the newly generated stream B', while copying the odd samples. Samples of stream B' are: $B'_0, B'_1, B'_2, \ldots$ with $B'_{2i+1}=B_{2i+1}$ & $B'_{2i}=(B'_{2i-1}+B'_{2i+1})/2$. All odd samples are thus identical to the original data and all even samples are defined as the linear interpolation of the next and previous sample.

Figure 6:
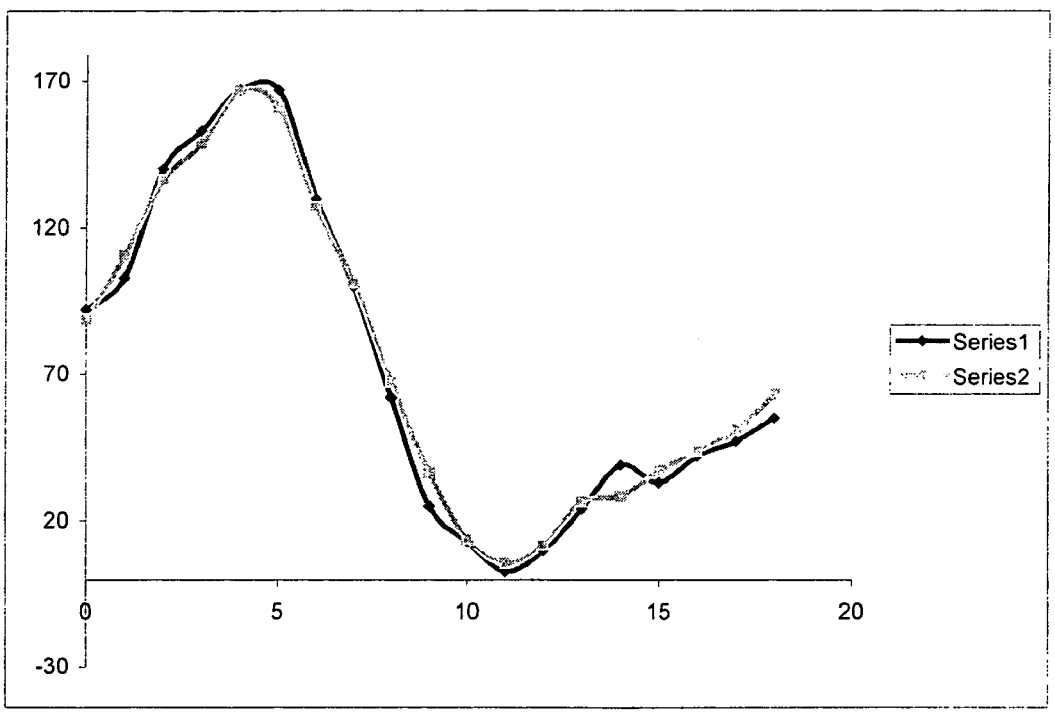
FIG. 6 illustrates a mixed audio stream A+B (series 1) and an approximated mixed audio stream A'+B' (series 2).

In FIG. 6, both original streams A and B are mixed (added) to get a first mixed stream A+B (dark gray, series 1). Approximated streams A' and B' are mixed (added) to get a second mixed stream A'+B' (light gray, series 2). The second mixed stream A'+B' can be different from the first mixed stream A+B for every sample, since A' or B' may differ from the original samples, but generally the second mixed stream is still a good approximation of the original mixed stream A+B (dark gray, series 1) stream.

For un-mixing the mixed stream A'+B', so as to obtain the approximated mono signals A', B' out of the mixed stream A'+B', the original first sample $A_0=A'_0$ of the first audio stream A and the second sample $B_1=B'_1$ of the second audio stream B are needed.

Un-Mixing of the (mono) signals out of A'+B' can be done as follows: The second mixed stream A'+B' samples are: $A'_0+B'_0, A'_1+B'_1, A'_2+B'_2, A'_3+B'_3, A'_4+B'_4, A'_5+B'_5, \ldots$. When having a copy of the first sample $A_0=A'_0$ of the first audio stream A and of the second sample $B_1=B'_1$ of the second audio stream B, the A' and B' streams can be reconstructed.

1. with $(A'_0+B'_0)$ and $(A'_0)$ known, $B'_0$ can be obtained
2. with $(A'_1+B'_1)$ and $(B'_1)$ known, $(A'_1)$ can be obtained
3. with $(A'_0)$ and $(A'_1)$ known, $(A'_2)$ can be obtained using $A'_1=(A'_0+A'_2)/2$ or thus $A'_2=(2 A'_1-A'_0)$
4. with $(A'_2+B'_2)$ and $(A'_2)$ known, $(B'_2)$ can be obtained
5. with $(B'_1)$ and $(B'_2)$ known, $(B'_3)$ can be obtained using $B'_2=(B'_1+B'_3)/2$ or thus $B'_3=(2 B'_2-B'_1)$
6. with $(A'_3+B'_3)$ and $(B'_3)$ known, $A'_3$ can be obtained
7. etc. ...

If this mixing process of an original audio stream C, D with an interpolated audio stream C', D' is repeated for another pair of (mono) PCM streams (C, D), a second (mono) mixed PCM stream C+D is obtained. These 2 (mono) mixed PCM streams A+B, C+D make up an equivalent stereo PCM stream, which is the basic PCM audio data generated by the CD+G(w) encoder and used by the CD+G authoring tools.

With this basic principle in mind, it can be concluded that at least some (identical) duplicates ($A_0=A'_0$ & $B_1=B'_1$) of the initial first PCM samples from the original streams are required as part of the filter parameters, in order to be able to decode or un-mix the mixed audio PCM stream(s).

2. Restrictions and Limitations of Basic Principle.

The basic idea as explained in previous section to mix/un-mix 2 mono PCM streams has several limitations and restrictions.

Approximation of a PCM stream, using linear interpolation to approximate the odd samples of one stream (while copying the even samples), and vice-versa for the other PCM stream, results in loss of higher frequency information of the original PCM stream. Therefore a more complex approximation technique may be used, which includes optimization of filter parameters using criteria as minimization of interpolation errors, or optimization of frequency characteristics, which may include perceptual characteristics as part of the optimization criteria.

Mixing 2 PCM streams may result in overshoots. Each of the PCM streams of the present example is a 16 bit 44.1 kHz stream with 16 bit signed integer PCM values with max 32767 & min −32768. Adding 2 PCM streams where each stream could have its maximum of 32767 at the same moment gives a total value of 65534, which exceeds the 16 bit (signed) PCM maximum. To avoid such overshoots a dynamic compression scheme may be used, applied to the PCM data, prior to mixing all these streams into one down-mixed stereo stream.

The filter parameters used by more complex techniques in PCM stream approximation, are the result of an optimization and are represented as floating point values. However, to make the encoding/decoding processing independent of floating point arithmetic implementations, the CD+G(w) encoding used with the present invention will be based on integer computations, and as such the parameters have to be converted or represented by an integer number, both for the Encoding as well as the Decoding.

Finally, un-mixing of the PCM samples with this basic algorithm may result in errors, when an error is read from the CD+G disc. The nature of this process is such that all reconstructed samples after a single read-error, will be incorrect also, because the next PCM samples are reconstructed using the previous sample with its error, leading to additional errors.

The Advanced CD+G(w) Encoding/Decoding technique according to the present invention will deal with all these shortcomings and/or limitations.

3. Advanced Encoding & Decoding According to Embodiments of the Present Invention a. Filter Parameters.

Figures 7, 9:
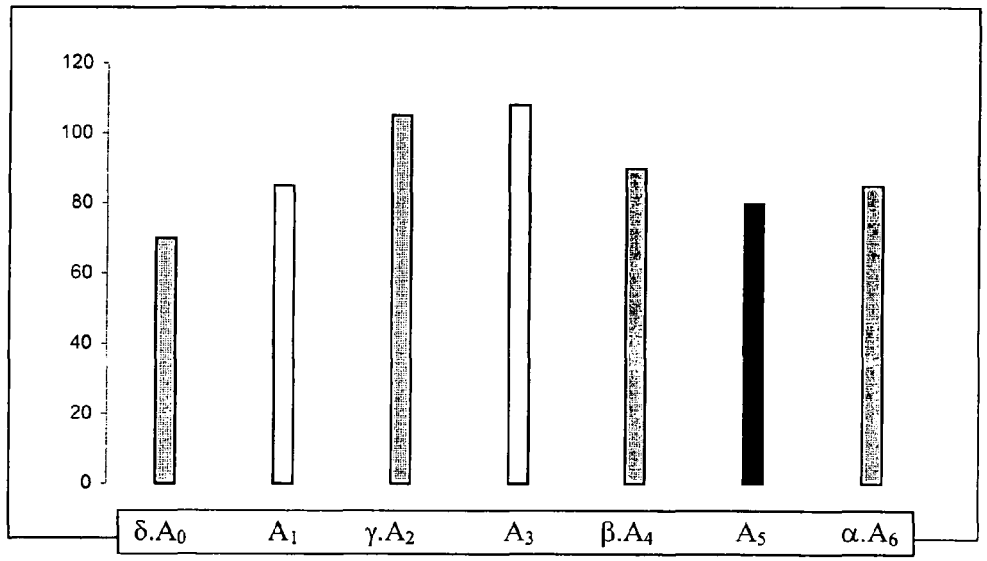
FIG. 7 illustrates sample approximation of sample $A_5$ based on an FIR filter.
FIG. 9 is a table illustrating a comparison of MIDI data properties for standard MIDI data and for MIDI data included in the CD+G(w) format as used according to embodiments of the present invention.

For the first PCM stream, the odd samples need to be interpolated. Linear interpolation, as explained in the section about the basic principle, is replaced by a FIR filter, where the filter parameters are optimized as shown in FIG. 7.

The filter parameters are used to approximate the odd samples, e.g. the sample at $A_5$ is generated from the even samples $A_0, A_2, A_4$ & $A_6$. $A'_5 = \alpha.A_6+\beta.A_4+\gamma.A_2+\delta.A_0$.

The general formula for approximation of an odd sample $A'_{2i+5}$ is:

$$A'_{2i+5}=\alpha.A_{2i+6}+\beta.A_{2i+4}+\gamma.A_{2i+2}+\delta.A_{2i} \text{ or } A'_{2i+6}=(1/\alpha).(A'_{2i+5}-\beta.A_{2i+4}-\gamma.A_{2i+2}-\delta.A_{2i})$$

This formula can be used for the basic algorithm when $(\alpha, \beta, \gamma, \delta)$ is defined as $(0.5, 0.5, 0, 0)$, but with the encoder according to embodiments of the present invention, $(\alpha, \beta, \gamma, \delta)$ is the result of an optimization, which will be explained later. Furthermore, since the decoder will need $(1/\alpha)$, constraints are defined on the parameter sets, to avoid $\alpha$ values too close to 0, as to eliminate divisions by zero. Since furthermore integer computations are used in the final encoding and decoding scheme, even higher constraints are to be set on the $\alpha$ values to avoid computations which introduce too high rounding errors.

The formula for approximation of an even sample $B'_{2i+6}$ is:

$$B'_{2i+6}=\alpha.B_{2i+7}+\beta.B_{2i+5}+\gamma.B_{2i+3}+\delta.B_{2i+1} \text{ or } B'_{2i+7}=(1/\alpha).(B'_{2i+6}-\beta.B_{2i+5}-\gamma.B_{2i+3}-\delta.B_{2i+1})$$

A first PCM stream A, with samples $A_0, A_1, A_2, A_3, A_4, A_5, A_6, A_7, \ldots$, is used to generate new stream A'. The new stream A' is an approximation of the first stream A, whereby even samples are being copied from the first PCM stream A, and odd samples are approximated. Samples of A' are: $A'_0, A'_1, A'_2, A'_3, A'_4, A'_5, A'_6, A'_7, \ldots$ with $A'_{2i}=A_{2i}$ & $A'_{2i+5}$ is defined by the formula above for all $i \geq 0$. $A'_i=A_i$ for $i<5$. A second PCM stream B, with samples $B_0, B_1, B_2, B_3, B_4, B_5, B_6, B_7, \ldots$ is used to generate new stream B'. The new stream B' is an approximation of the second stream B, whereby odd samples are being copied from the second PCM stream B, and even samples are approximated. Samples of B' are: $B'_0$, $B'_1$, $B'_2$, $B'_3$, $B'_4$, $B'_5$, $B'_6$, $B'_7$, ... with $B'_{2i+1} = B_{2i+1}$ & $B'_{2i+6}$ defined by an equivalent formula for all $i \geq 0$. $B'_i = B_i$ for $i < 6$.

b. Un-Mixing Operations

When mixing these newly generated streams A' and B', the following is obtained: $A'_0 + B'_0$, $A'_1 + B'_1$, $A'_2 + B'_2$, $A'_3 + B'_3$, $A'_4 + B'_4$, $A'_5 + B'_5$, $A'_6 + B'_6$, $A'_7 + B'_7$, $A'_8 + B'_8$, $A'_9 + B'_9$ ....
Using a copy of the first even samples $A_0, A_2, A_4$ of the first audio stream A, and a copy of the first odd samples $B_1, B_3, B_5$ of the second audio stream B, and the filter parameter sets $(\alpha_A, \beta_A, \gamma_A, \delta_A)$ and $(\alpha_B, \beta_B, \gamma_B, \delta_B)$ the following un-mixing scheme can be defined:

1. with $(A'_0 + B'_0)$ and $(A'_0)$ known, $B'_0$ can be obtained
2. with $(A'_1 + B'_1)$ and $(B'_1)$ known, $A'_1$ can be obtained
3. with $(A'_2 + B'_2)$ and $(A'_2)$ known, $B'_2$ can be obtained
4. with $(A'_3 + B'_3)$ and $(B'_3)$ known, $A'_3$ can be obtained
5. with $(A'_4 + B'_4)$ and $(A'_4)$ known, $B'_4$ can be obtained
6. with $(A'_5 + B'_5)$ and $(B'_5)$ known, $A'_5$ can be obtained
7. with $A'_0, A'_2, A'_4, A'_5$ known, $A'_6$ can be calculated using $A'_6 = (1/\alpha_A) \cdot (A'_5 - \beta_A \cdot A'_4 - \gamma_A \cdot A'_2 - \delta_A \cdot A'_0)$
8. with $(A'_6 + B'_6)$ and $(A'_6)$ known, $B'_6$ can be obtained
9. with $B'_1, B'_3, B'_5, B'_6$ known, $B'_7$ can be calculated using $B'_7 = (1/\alpha_B) \cdot (B'_6 - \beta_B \cdot B'_5 - \gamma_B \cdot B'_3 - \delta_B \cdot B'_1)$
10. with $(A'_7 + B'_7)$ and $(B'_7)$ known, $A'_7$ can be obtained
11. with $A'_2, A'_4, A'_6, A'_7$ known, $A'_8$ can be calculated using $A'_8 = (1/\alpha_A) \cdot (A'_7 - \beta_A \cdot A'_6 - \gamma_A \cdot A'_4 - \delta_A \cdot A'_2)$
12. with $(A'_8 + B'_8)$ and $(A'_8)$ known, $B'_8$ can be obtained
13. with $B'_3, B'_5, B'_7, B'_8$ known, $B'_9$ can be calculated using $B'_9 = (1/\alpha_B) \cdot (B'_8 - \beta_B \cdot B'_7 - \gamma_B \cdot B'_5 - \delta_B \cdot B'_3)$
14. with $(A'_0 + B'_9)$ and $(B'_9)$ known, $A'_9$ can be obtained
15. etc. ...

At this stage it can be concluded that next to the parameter sets $(\alpha_A, \beta_A, \gamma_A, \delta_A)$ and $(\alpha_B, \beta_B, \gamma_B, \delta_B)$, also a copy of 3 samples of the first series $(A'_0, A'_2, A'_4)$ and 3 samples of the second series $(B'_1, B'_3, B'_5)$ will be needed.

c. Time Sections & Parameter Integer Mapping

One of the restrictions of the basic principle was that it does not recuperate from an error. A way to limit the effects of a reading error (reading the samples digitally from the CD) is to limit the use of these parameters $(\alpha_A, \beta_A, \gamma_A, \delta_A)$ and $(\alpha_B, \beta_B, \gamma_B, \delta_B)$ and the initial samples series $(A'_0, A'_2, A'_4)$ and $(B'_1, B'_3, B'_5)$ to a restricted number of PCM samples. It has been found that 40 msec of audio samples (3×588 samples) is an acceptable length for a sample series. Such a group of samples will be referred to as a 'section'. This allows to reduce the error effect to a single section, (max 40 msec) as well as to optimize a group of filter parameters for a shorter amount of samples, giving better behavior in terms of e.g. interpolation errors or frequency characteristics. For each of these sections the initial 3 samples will be needed, as well as the filter parameters.

As mentioned earlier, the filter parameters $(\alpha, \beta, \gamma, \delta)$ are optimized and results are floating point numbers. These numbers are represented by integers because the encoding and decoding algorithm is implemented with integer operations, to make it portable and independent of floating point implementations. The following conversion is used for representing these parameters using a 16 bit signed number and a 2 bit value (base number). E.g. $\alpha$ is converted into an integer value A from (−32768) to 32767 while Ab gets values 0, 1, 2 or 3. The procedure is explained below:

First define the base value Ab:
When $\alpha > 0$: Ab=(unsigned char)(fabs($\alpha$+ 0.9999999999999999999999))−1;
else if $\alpha < 0$: Ab=(unsigned char)(fabs($\alpha$− 0.9999999999999999999999))−1;
else: Ab=0;
remark: fabs(x) returns the absolute value of the floating point value x.
Next,
when Ab>7: overflow condition; parameter optimization should not get such values
when Ab=7, 6, 5 or 4, Ab is reset to Ab=3
when Ab=3 or 2, Ab is reset to Ab=2
when Ab=1, Ab is not changed.
when Ab=0, Ab is not changed.
Or, to summarize
Ab=0 when $1 \geq \alpha \geq (-1)$,
Ab=1 when $2 \geq \alpha > 1$ or $(-1) > \alpha \geq (-2)$,
Ab=2 when $4 \geq \alpha > 2$ or $(-2) > \alpha \geq (-4)$,
Ab=3 when $8 > \alpha > 4$ or $(-4) > \alpha > (-8)$.

Finally, $\alpha$ is converted into a 16 bit signed integer using the following formula:

$$A = (\text{short})(\alpha \times (32768 / (1 << Ab))).$$

This way, $\alpha$ is converted into a pair (A, Ab), $\beta$ is converted into a pair (B, Bb), $\gamma$ is converted into a pair (C, Cb) and $\delta$ is converted into a pair (D, Db). The base numbers Ab, Bb, Cb, Db are merged into one 16 bit BASE=Ab|(Bb<<4)|(Cb<<8)|(Db<<12)

Conclusion at this stage is as follows:

For each section of 40 msec. from a single 16 bit mono 44.1 kHz PCM stream, or 3×588 16 bit (mono) samples, the encoder according to embodiments of the present invention defines a filter parameter set $(\alpha, \beta, \gamma, \delta)$ and converts these parameters into four 16 bit signed numbers (A, B, C, D) and one 16 bit BASE number. Furthermore, for the un-mixing operation, 3 16 bit samples are required; series $(A'_0, A'_2, A'_4)$. This totals to 8 16 bit values (4+1+3), required for un-mixing operations. For the second 16 bit mono 44.1 kHz PCM stream, a similar set of 8 16 bit values are generated by the encoder according to embodiments of the present invention.

In total, the encoder according to embodiments of the present invention is capable of mixing a plurality, e.g. 4, mono 16 bit PCM streams into 1 stereo 16 bit PCM stream. 1 second of music is split into sections of 40 msecs (or 25 sections per second). Each section requires 4× 8× 16 bit values/parameters.

At this stage, the encoder requires 25× 4× 8× 2× bytes additional data per second, or 1600 bytes per second.

d. Advanced Mixing Schemes & Other Parameters According to Embodiments of the Present Invention So far examples have been given of mixing two mono 16 bit PCM streams into another mono 16 bit PCM stream, but the encoder according to embodiments of the present invention supports different mixing & un-mixing schemes or 'Mixing-Modes'. The selected Mixing-Mode is part of the CD+G(w) parameters, using a 4 bit Mixing-Mode parameter.

The following Mixing-Modes are given as reference examples and may be used with a encoder according to the present invention;

Mixing-Mode 0: Solo Stereo (Instrument/Vocal) mixed with Stereo Background.
Stereo Solo Instrument or Vocal, left and right channels are (Solo-L, Solo-R)
Stereo Background, left and right channels are (Bckg-L, Bckg-R)
Get mixed to: Stereo Mixed channels (Solo-L+Bckg-L, Solo-R+Bckg-R).
No further additional mixing or un-mixing operations are required.

Mixing-Mode 1: Mono Vocal AND Instrument mixed with Stereo Background.
   Mono Vocal channel is (Voc)
   Mono Instrument channel is (Instr)
   Stereo Background, left and right channels are (Bckg-L, Bckg-R)
      Get mixed to: Stereo Mixed channels (Bckg-L+a.Voc+b.Instr, Bckg-R+c.Voc+d.Instr)
   Panning of Instrument & Vocal depends on values for (a,b,c,d), where a, b, c and d are such that there is no number t such that a=t.c & b=t.d. Typical values are:
      (a,b,c,d)=(1,1,1,2): pans vocal in the center, instrument more to right side.
      (a,b,c,d)=(1,2,1,1): pans vocal in the center, instrument more to left side.
      (a,b,c,d)=(2,1,1,2): pans vocal more to left side, instrument more to right side.
      (a,b,c,d)=(1,2,2,1): pans vocal more to right side, instrument more to left side.
      a,b,c or d may be >2, but these examples will cover most cases.
   This mixing scheme requires some additional operations in order to prepare the original streams to be down-mixed. Hereto 2 new mono streams are generated first;
      LeftVI=a.Voc+b.Instr
      RightVI=c.Voc+d.Instr
   These new streams were mixed with the Background channels (Bckg-L, Bckg-R) into (Bckg-L+a.Voc+b.Instr, Bckg-R+c.Voc+d.Instr). Un-Mixing of these streams will deliver LeftVI & RightVI, which may be used to reconstruct the Vocal and Instrument tracks, using this formula:
      Instr=(a/(d.a-c.b)).(RightVI-(c/a).LeftVI)
      Voc=(b/(c.b-a.d)).(RightVI-(d/b).LeftVI)
   Mixing-Mode 2: 4 Independent Mono channels mixed to 1 stereo down-mix
      Mono Channel 1 is (C1)
      Mono Channel 2 is (C2)
      Mono Channel 3 is (C3)
      Mono Channel 4 is (C4)
      Get mixed to: Stereo Channels (a.C1+b.C2+a'.C3+b'.C4, c.C1+d.C2+c'.C3+d'.C4) This mixing scheme requires some additional operations in order to prepare the original streams to be down-mixed. Hereto 4 new mono streams are generated first;
         Left1=a.C1+b.C2
         Right1=c.C1+d.C2
         Left2=a'.C3+b'.C4
         Right2=c'.C3+d'.C4
      These channels are mixed to (Left1+Left2, Right1+Right2). The pair (a,c) defines the panning of the first channel C1 into the stereo down-mix. (b,d), (a'c') & (b'd') respectively define the panning for C2, C3 & C4. Again the restriction applies that there are no numbers t & t' such that a=t.c & b=t.d AND a'=t'.c' & b'=t'.d'.
      Typical values are:
         (a,c)=(3,1): pans Channel 1 to the left
         (b,d)=(1,3): pans Channel 2 to the right
         (a',c')=(2,1): pans Channel 3 to the left-center
         (a',c')=(1,2): pans Channel 4 to the right-center
      From the stereo mix (Left1+Left2, Right1+Right2), Left1 & Left2, Right1 & Right2 may be un-mixed. From these unmixed channels, C1, C2, C3 & C4 may be reconstructed using:
         C1=(b/(c.b-a.d)).(Right1-(d/b).Left1)
         C2=(a/(d.a-c.b)).(Right1-(c/a).Left1)
         C3=(b'/(c'.b'-a'.d')).(Right2-(d'/b').Left2)
         C4=(a'/(d'.a'-c'.b')).(Right2-(c'/a').Left2)

Mixing-Mode 3: Quadraphonic audio: Stereo Front & Stereo Rear channels
   Stereo Front left and right channels are (Fr-L, Fr-R)
   Stereo Rear left and right channels are (Rr-L, Rr-R)
   Get mixed to: (Fr-L+a.Rr-L, Fr-R+a.Rr-R)
   Rear channels typically are attenuated before mixing to a stereo recording: (Fr-L+a.Rr-L, Fr-R+a.Rr-R). The parameter 'a' indicates an attenuation of 0 dB down to −255 dB Mixing-Modes 4-15: Other mixing-modes are free to be defined for dedicated applications, and standard decoders/encoders may or may not support these extra modes.

Since the encoder according to embodiments of the present invention is capable of mixing and un-mixing different panning schemes, additional parameters are required by the decoder according to embodiments of the present invention and generated by the encoder to select the correct un-mixing scheme. Additional options could be to include dynamic surround-panning information used by the decoder to position the independent channels within the 3D-Audio-space dynamically. E.g. use 1 byte for dynamic Left/Right panning, and another byte for dynamic Front/Rear panning for a specific channel. Another option is to store additional filter parameters, e.g. for filter characteristics which may be useful when pitch shift or time-stretch operations are applied to the un-mixed audio channels. Audio processing techniques like pitch shift is useful for karaoke, and time-stretching is useful when CD+G(w) is used as a basis for music training for play and sing along. The processing effects create somehow distortion and additional filters may be helpful to reduce the artifacts of these effects. The use of such additional parameter sets is only included here as extensional options.

To be able to link the parameter groups to the correct audio section number, the Section Number may be included as part of the parameters. These section numbers are relative to the start of that specific track. (The first section of a stereo track is number 0). For these section numbers, 18 bits are allocated (max is 131071). (80 mins=80×60×25=120000 sections). Next, the CD+G(w) format may also incorporate Midi & Lyrics data. If this data is present, it is indicated using a single bit for Midi, and another bit for Lyrics.

To summarize, for each audio section, 8 extra bytes are used to specify these parameters:
   byte 1: ((Section Number & 0x000FF))
   byte2: ((Section Number & 0x0FF00)>>8)
   byte3: ((Section Number & 0x30000)>>16)|(Mixing-Mode<<2)|(Midi<<6)|(Lyrics<<7)
   Next bytes depend on the Mixing-Mode:
   Mixing Mode 0:
   byte4-byte8: could be used to store parameters of time-stretch or pitch-shift filters
   Mixing Mode 1:
   byte4: (a<<6|b<<4|c<<2|d) (Mixing scheme a.V+b.I & c.V+d.I)
   byte5-byte8: used for time-stretch/time-shift filters or dynamic audio panning of 1 or 2 channels, 1 byte for Left/Right: (0x80: center, 0xFF: right, 0x00: left), another byte for Front/Rear: (0x80: center, 0xFF: front, 0x00: rear)
   Mixing Mode 2:
   byte4: (a<<6|b<<4|c<<2|d) (Mixing scheme a.C1+b.C2 & c.C1+d.C2)
   byte5: (a'<<6|b'<<4|c'<<2|d') (Mixing scheme a'.C3+b'.C4 & c'.C3+d'.C4)
   byte6-byte8: used for time-stretch/time-shift filters or dynamic audio panning of 1 or 2 channels, 1 byte for Left/Right: (0x80: center, 0xFF: right, 0x00: left), another byte for Front/Rear: (0x80: center, 0xFF: front, 0x00: rear)

Mixing Mode 3:

byte4: a surround audio channel attenuation (0 dB to −255 dB)

byte5-byte8: available

Mixing Mode 4-15: the modes are to be defined, depending on the application.

byte4-byte8: to be defined

These extra 8 bytes per section, 25 sections per second, count for another 200 bytes per second, such that the total of parameter data according to embodiments of the present invention, including the audio filtering parameters, amount to 1600+200=1800 bytes per second.

e. Compressors

Mixing of PCM streams may introduce overshoots. A signed 16 bit PCM number is limited to values between (−32768) to (32767). In order to explain the compression schemes, the PCM streams used in the following mixing example are defined as follows:

A mono 16 bit PCM stream (Vocal) and a mono 16 bit PCM stream (Instrument) are mixed with a stereo 16 bit PCM stream (Background-L/Background-R audio).

The first pass of the encoder according to embodiments of the present invention is to define the filter parameters for Vocal, Instrument, Background-L & Background-R. The streams are converted first into floating point data, and mapped to a scale of values between (−1) and (1). The 'odd'-sample approximation is used for Vocal and Instrument streams, and 'even'-sample approximation for Background-L & Background-R. These newly generated approximated streams are Voc', Instr', BckgL' & BckgR'. Due to the nature of the approximation, overshoots may have been introduced during the generation of these new streams, getting values >1 or <(−1). Therefore the new data is scaled, typically by multiplying with (½), back to a range of values between (−1) and (1) and finally the streams are converted into 24 bit signed PCM streams with values between (−8388608) and (8388607) to add resolution.

Next the time stamps of these samples generating overshoots are identified prior to mixing these into the final stereo down-mix. For each of these streams individually, the compression factors associated with the time stamps required to reduce the overshoot are defined. Each sample not generating an overshoot will get a scale factor of 1, but samples generating overshoots get a scale factor <1. For each stream a Maximum Threshold value is defined. Every sample where e.g. |Voc'$_i$|>MaxThreshold, gets a scale factor defined by (MaxThreshold/|Voc'$_i$|). The compressed streams are defined as Voc", Instr", BckgL" and BckgR".

The final down-mix into the stereo stream is another source for introducing overshoots, which requires further compression. For example if a following mixing scheme is taken: (BckgL"+Voc"+2xInstr") & (BckgR"+Voc"+Instr"). When |(BckgL"$_i$+Voc"$_i$+2xInstr"$_i$)|>MaxThld OR |(BckgR"$_i$+Voc"$_i$+Instr"$_i$)|>MaxThld an additional scale factor is defined. In case both (left and right) mixed-samples require compression, the highest compression is selected and applied to both. In case only one mixed-sample requires compression, that compression is still applied to both mix-samples (both left and right sample). As a result of the compression new streams are obtained, Voc*, Instr*, BckgR* & BckgL*, where e.g. Voc*$_i$=Voc$_i$×Vcompr$_i$ and Vcompr is the result of multiplying all scale factors applied to that particular sample from that stream. The sequence of all these compression factors to generate e.g. Voc* as such, make up a new stream Vcompr, of which most of the scale factors will be =1 and those requiring compression will have a scale factor <1.

At this stage, 4 compression factor data streams are obtained, Vcompr, Icompr, BRcompr & BLcompr, defining the required scale factors for each sample in each PCM audio stream. These are actually 'impulse' compression, as they will operate on the specific samples introducing overshoots when mixing. Applying such compression to only 'isolated' samples will introduce substantial distortion or artifacts in the audio recording, because an 'impulse' sample compression would be no different from a discontinuity of the audio stream. Therefore a time-effect filter needs to be applied, which spreads the compression effect out over a typical time length of 100 msecs prior to and after these specific time stamps of these samples.

Figure 8:
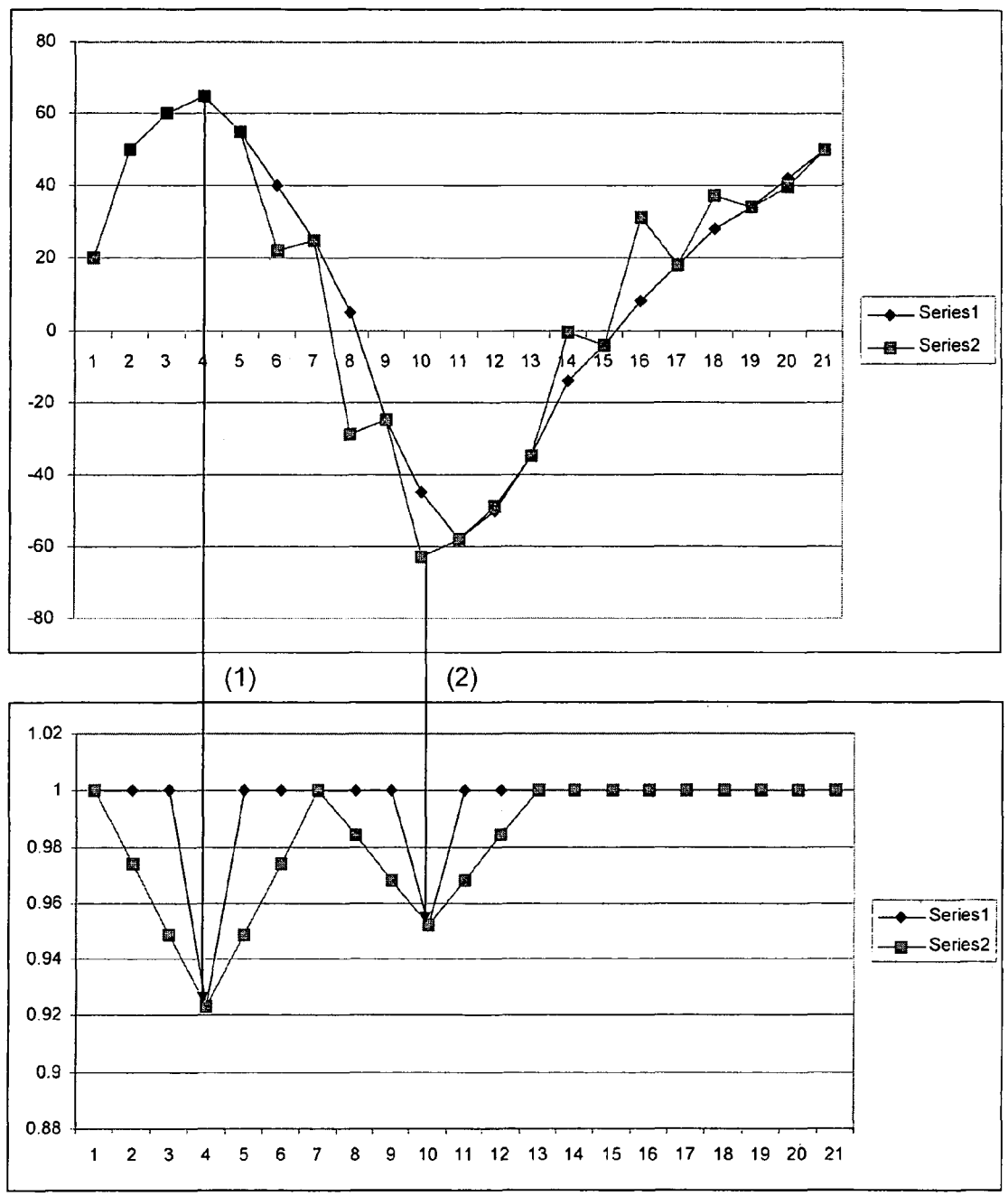
FIG. 8 illustrates audio compression due to mixing or interpolation.

FIG. 8 gives an overview of the compression factors, where the compression effect is applied over several consecutive samples.

In the upper section of FIG. 8, the line with dark rhombs (series 1) represents samples of the original stream. The line with gray squares (series 2) is the result of a (bad) approximation. If a Threshold value of 60 is defined, 2 samples are present where compression is needed, at position 4 from the original samples and at position 10, because of the approximation.

In the lower section of FIG. 8, the line with dark rhombs (series 1) represents the 'impulse' compression factors, while the light gray line (series 2) defines a better compression to be used according to an embodiment of the present invention. Gradual compression is applied on a number of samples before and after the 'impulse' compression cases, e.g. on two samples before and two samples after the sample where compression is needed.

f. Parameter Optimization.

As explained in the section hereinabove about the Filter parameters used by the encoder/decoder in accordance with embodiments of the present invention, the filter parameters ($\alpha, \beta, \gamma, \delta$) have to be optimized. The parameters are used for approximation of a section of 1 mono 16 bit 44.1 kHz PCM stream. Such a section is equivalent to 3×588 samples, or 40 msecs. Optimization of the parameters requires optimization criteria. The following paragraph gives an overview of the different criteria useful for optimization.

For reference, the original section of that mono PCM stream is defined as A, with samples $A_i$ and $0 \leq i < 1764$, and filter parameters ($\alpha, \beta, \gamma, \delta$). The result of the approximation is a new stream, $A'_i (0 \leq i < 1764)$, with $A'_{2i}=A_{2i}$, $A'_{2i+5}=\alpha.A_{2i+6}+\beta.A_{2i+4}+\gamma.A_{2i+2}+\delta.A_{2i}$ and $A'_i=A_i$ for i<5.

As explained before, a constraint-optimization is defined with a parameter $\alpha>(0.1)$, since that parameter is not allowed to be too close to 0. The optimization criteria may be defined as:

A. Weighted Minimal Linear Interpolation Error:

$$\min\left(\sum_{i=0}^{1763} W_i(A_i - A'_i)^2\right)$$

with $W_i$ weighting factor, defined e.g. in function of $|A_i-A'_i|$ or e.g. of $|A_i|$. The weighting factors may be used to increase the effect of errors relative to the approximation error or the absolute value of the samples.

B. Similar frequency spectrum.

Define $F_A$=DFT(A) and $F_{A'}$=DFT(A') as the Discrete Fourier Transforms of the audio sections A with $A_i (0 \leq i < 1764)$ and A' with $A'_i$ ($0 \leq i < 1764$). $F_{Ai}$ & $F_{A'i}$ are complex numbers. The power spectrum is defined by $PF_{Ai}=F_{Ai}*cj(F_{Ai})$ and $PF_{A'i}=F_{A'i}*cj(F_{A'i})$ with cj the complex conjugate. $PF_{Ai}$ ($0 \leq i < 882$) is the power spectrum of section A for freq between 0 & 22.05 kHz. $PF_{A'i}$ ($0 \leq i < 882$) is the power spectrum of section A'.

When optimizing the filter parameters ($\alpha$, $\beta$, $\gamma$, $\gamma$), criteria can be defined, based on the power spectrum of the approximated stream and the original stream. Since the new stream is created by copying every even sample into the new stream, it may be expected that the power spectrum for frequencies in the range of 0-11.025 kHz will be similar. However, the power spectrum for frequencies in the range of 11.025 kHz up to 22.050 kHz may be substantially different. Therefore the optimization criteria could be defined as:

$$\min\left(\sum_{i=434}^{868} W_i(PF_{Ai} - PF_{A'_i})^2\right)$$

with $W_i$ weighting factors e.g. to increase the effect of i=434 higher frequency power errors. In the example, we look at the power errors for the frequency range from 10.85 kHz (434) to 21.70 kHz (868).

C. More complex optimization criteria may be applied, like those taking perceptual audio characteristics into account, or combinations of different criteria. In any case a set of parameters ($\alpha$, $\beta$, $\gamma$, $\delta$) is obtained to be used by the decoder and the encoder. The encoder and decoder schemes are independent from the selected optimization criteria for the filter parameters.

g. Integer Implementation.

The Encoding Process according to embodiments of the present invention requires several steps. There is started from original streams A and B, and next the filter parameters are optimized for sections of 40 msecs. Using these filters A' and B' are obtained as approximated streams. These approximated streams A' and B' are then mixed according a selected mixing scheme. Hereto, the compression factors are defined (represented by compression streams) and these are applied to the original streams A & B, prior to the mixing, to get A" and B".

As explained in previous paragraphs, the decoder and encoder will be implemented using integer operations, to make the encoding and decoding independent of floating point arithmetic implementation. Because of this approach, rounding errors are introduced. This is especially true for formulas like: $A^*_{2i+5}=\alpha.A"_{2i+6}+\beta.A"_{2i+4}+\gamma.A"_{2i+2}+\delta.A"_{2i}$ or $A"_{2i+6}=(1/\alpha).(A^*_{2i+5}-\beta.A"_{2i+4}"-\gamma.A"_{2i+2}-\delta.A"_{2i})$.

As mentioned before, the filter parameters ($\alpha$, $\beta$, $\gamma$, $\delta$) are represented as 16 bit integer numbers (A,B,C,D) with base numbers (Ab,Bb,Cb,Db). Using this representation, the encoding formula:

$$A^*_{2i+5}=\alpha.A"_{2i+6}+\beta.A"_{2i+4}+\gamma.A"_{2i+2}+\delta.A"_{2i}$$

is converted to a 32 bit integer operation:

$$A^*_{tmp}=(1<<Ab).A.A"_{2i+6}+(1<<Bb).B.A"_{2i+4}+(1<<Cb).C.A"_{2i+2}+(1<<Db).D.A"_{2i}$$

and converted back to a 16 bit integer value:

If ($A^*_{tmp} > 0$) then $A^*=(A^*_{tmp}+16384)/32768$;
Else $A^*=(A^*_{tmp}-16384)/32768$;

This integer implementation of this approximation as such may be another source for generating overshoot conditions, which needs to be checked again:

If (|A*|>MaxThreshold) then 'Report overshoot condition!!'
Else $A^*_{2i+5}=A^*_{tmp}$ In case a new overshoot condition exists, the initial compression streams needs to be re-defined, by using smaller MaxThreshold values.

Next to analyzing the effects of the integer implementation of the Encoding formula, the effects of the integer implementation of the decoder have to be analyzed as well. The decoder formula used is:

$$A"_{2i+6}=(1/\alpha).(A^*_{2i+5}-\beta.A"_{2i+4}-\gamma.A"_{2i+2}-\gamma.A"_{2i}).$$

Converted to a 32 bit integer formula:

$$A"_{tmp}=(32768.A^*_{2i+5})-(1<<Bb).B.A"_{2i+4}-(1<<Cb).C.A"_{2i+2}-(1<<Db).D.A"_{2i}$$

$$A"=A"_{tmp}/((1<<Ab).A)$$

Again, this integer implementation of this approximation may be another source for generating overshoot conditions, which need to be checked again:

If (|A"|>MaxThreshold) then 'Report overshoot condition!!

Furthermore, due to integer conversions and associated rounding error, A" is not necessary equal to $A"_{2i+6}$. To guarantee that the decoder will work correctly, the original value $A"_{2i+6}$ is 'updated' or 'replaced' with the approximated value of A". This updated value of $A"_{2i+6}$ will then next be used as one of the values used in the next approximation of $A"_{2i+7}$.

A consequence of these rounding errors is that not only the odd samples of the stream are approximated, but also the even values are 'updated' with values for which the decoder formula will give the correct (updated) 'value'. Successive updates may be needed for the even samples, which may lead to divergence. Therefore it is required to indicate the level or rounding error corrections. As mentioned earlier a constraint optimization is made use of for the parameters ($\alpha$, $\beta$, $\gamma$, $\delta$) to avoid to high rounding errors. For the $\alpha$ parameter, a lower limit of 0.1 is typically set, which turns out to be a good trade-off between filter optimization characteristics on one hand, and minimization of the rounding errors on the other. If however the rounding error effect is still too high, the optimization has to be redone with higher constraints for the parameters.

In a further aspect, the present invention Midi and Lyrics data are included in the encoder format.

As explained in previous sections, the CD+G(w) format used for embodiments of the present invention also incorporates Midi data as well as lyrics. Lyrics is included as part of the Midi data stream.

Midi (musical instruments digital interface) defines an a-synchronous serial protocol used by musical instruments to transmit data. The bit-rate is defined as 31250 bits/sec. A byte is transferred using a start and stop bit, and the actual maximum byte rate is: 3125 bytes per second.

CD+G(w) uses, next to the PCM audio data, additional data channels (R-W sub-code channels from the CD) to store extra parameters. 1 sector of PCM audio data (this is $1/75^{th}$ of a second) has 72 additional R-W sub-code bytes. Because of an error correction layer, and some logical header data structures, the CD+G USER mode allows to store only 48 additional bytes, or 48×75=3600 bytes per second. 1800 bytes per second are used for the audio filter parameters as explained in previous sections, which take 24 bytes per section of the CD sub-codes. This leaves only 1800 bytes free for this Midi data or another 24 bytes per section. As such, it is concluded that this bandwidth (75×24=1800 bytes per sec) does not allow for storing midi data in a 'streaming format'.

Therefore, the Midi data used in the CD+G(w) format, comprises discrete data with time stamp information included. The discrete data is similar to the Midi data event(s) and the time stamp is the delta time, relative to the beginning of that particular sub-code data section. A typical midi message comprises 2 or 3 bytes. E.g.:

Note On Message:
Byte 1: Midi Note On (0x90) on Channel 2 (|0x02)
Byte 2: Midi Note number 64 (0x40)
Byte 3: Midi Note On velocity 32 (0x20)
Note Off Message:
Byte 1: Midi Note Off (0x80) on Channel 2 (|0x02)
Byte 2: Midi Note number 64 (0x40)
Byte 3: Midi Note Off velocity 0 (0x0)
Note Off Message (Running Status):
Byte 1: Midi Note number 64 (0x40)
Byte 2: Midi Note Off velocity 0 (0x0)

A typical Midi message takes 3 bytes, or 30 bits such that timing precision is no better than 1 msec. In CD+G(w) 1 byte is used to define the delta timing relative to the start of the CD sub-code section which holds the midi messages. 1 section is $\frac{1}{75}^{th}$ of a second, or 13.3 msecs. This time-length is divided into 49 time stamps, with a time stamp interval precision of ($\frac{12}{44100}$) or approx. 272 usecs. As such, the timing resolution of the CD+G(w) is 4× better compared to Midi. Because 8 bit values are used as timestamp, delays may be defined for midi events of approx. 70 msecs relative to the beginning of the section containing the Midi message. This enables to group more effective Midi messages within a shorter time interval.

Midi restricts the Velocity definition to 7 bit values, but CD+G(w) adds an extra 1 bit to increase velocity resolution. Typical Midi messages are 3 bytes or 2 bytes. Per CD Sub-code section 24 bytes are available. A 3 bytes midi message requires 4 bytes CD sub-code data (time-stamp included) while a 2 bytes midi message requires 3 bytes. Or, within 24 bytes 6× '3 bytes midi message' [6×(3+1)] or 8× '2 bytes midi message' [8×(2+1)] can be defined. If the average is taken, approx. 17 bytes of effective midi data are available within 1 sector of the CD+G(w) sub-code, or 17×75=1275 bytes per second.

A comparison of standard Midi data, & Midi data incorporated in the CD+G(w) format according to an embodiment of the present invention can be found in FIG. 9.

Midi will be used within the CD+G(w) format only as data for typical solo instrument and/or lyrics information, and not to replace a full orchestral or band performance. Because of this restricted use, the limited bandwidth of 1275 bytes per second is not considered to be a problem. Furthermore, timing and velocity precision are gained, which is specifically what is needed for the player instrument applications (auto-mated-play along).

Finally, a 16 bit CRC (Cyclic Redundancy Code) checksum, i.e. 16 bits appended to the end of a data block for error checking purposes, with an 8 bit header could be added per 3 sectors (40 msecs) as part of the midi data of the R-W subcode data, spanning both the PCM and the R-W subcode, as a reference used by the decoder to verify the integrity of both PCM and subcode data. If a CRC error is detected, the decoder should decide not to decode the PCM audio, play as regular Stereo, and handle midi data events in an appropriate manner.

From the above it will be appreciated that the present invention relates to an encoder for mixing a plurality of independent mono audio channels into a stereo recording and generating a restricted set of additional parameters used to master an audio track of a storage device, each audio channel comprising a first number of samples per unit time, the plurality of independent mono audio channels being stored on the storage device as less than the number of samples per unit time from each audio channel with the addition of calculated values, calculated using an interpolating filter with filter parameters, for intermediate samples, the calculated intermediate samples approximating the intermediate samples of the audio channels, the filter parameters being stored on the storage device in the additional parameters.

The present invention also relates to a decoder for decoding a plurality of recorded mono audio channels in a stereo recording using a restricted set of additional parameters for mastering an audio track of a storage device, each audio channel being reconstructed from a first number of samples per unit time, the plurality of mono audio channels being stored on the storage device as less than the number of samples per unit time from each audio channel with the addition of calculated values, calculated using an interpolating filter with filter parameters, for intermediate samples, the calculated intermediate samples approximating the intermediate samples of the audio channels, the filter parameters being stored on the storage device in the additional parameters.

The present invention also relates to a storage device having stored thereon a plurality of recorded mono audio channels in a stereo recording using a restricted set of additional parameters for mastering an audio track of the storage device, each audio channel being reconstructable from a first number of samples per unit time, the plurality of mono audio channels being stored on the storage device as less than the number of samples per unit time from each audio channel with the addition of calculated values, calculated using an interpolating filter with filter parameters, for intermediate samples, the calculated intermediate samples approximating the intermediate samples of the audio channels, the filter parameters being stored on the storage device in the additional parameters.

In one aspect the Encoder/Decoder according to the present invention can be used to encode and mix a number of independent channels, e.g. 4×44.1 kHz 16 bit mono, into a stereo audio recording, 44.1 kHz 16 bit, which generates a set of additional data parameters. The recording can be made on any suitable recording medium such as a solid state memory device or an optical disk. For example, these additional data parameters are copied to a standard audio optical disk such as a CD-DA (Digital Audio) using, for example the sub-code channels of the CD+G USER format. The decoder is capable of regenerating the plurality of independent channels. Different features for use in various audio applications such as Sing- & Play-Along or Automated Play-Along are provided.

A data parameter set is generated for each time period, e.g. for each 40 msecs of audio recording, and may include
Decoder Filter Parameters for reconstruction of the original Audio channels
Audio Mixing Mode & Parameters to indicate presence of Midi & Lyrics Data
Audio Panning & Attenuation Parameters
3D Dynamic Audio Panning data
Audio Filter Parameters for improved Time Stretching and/or Pitch Shift
Midi Data for electronic or automated musical instruments
Lyrics Data (integrated in the Midi)
16 bit CRC checksum data with 8 bit header (integrated in the Midi)

The present invention may be used with audio and/or video recordings on any form of storage device, e.g. solid state, optical disk such as CD-DA, CD-ROM, DVD-AUDIO or DVD-ROM, tape such as DAT tape. Also more than 4 audio channels can be recorded in such a way that each can be unmixed as needed, e.g. by using less samples from each audio mono track and calculating more intermediate points. However, this may reduce the overall audio quality and usually 4 tracks are sufficient.

The invention claimed is:

1. An encoder for mixing a plurality of independent mono audio channels into a stereo recording,
wherein said independent mono audio channels each comprise a first number of samples per unit time, and said encoder is arranged to mix said plurality of independent mono audio channels into a stereo recording by summing the plurality of audio channels and generating a restricted set of additional parameters used to master an audio track of a storage device,
wherein the encoder is arranged to store each of the plurality of mono audio channels on the storage device in a summed channel having a second number of samples per unit time that is less than the respective first number of samples per unit time together with a restricted set of additional parameters,
wherein the encoder includes an interpolating filter and the restricted set of additional parameters includes filter parameters of the interpolating filter, the interpolating filter being used to generate, by interpolation, immediate samples of said plurality of independent mono audio channels that were stored on the storage device by summing samples of one independent mono audio channel to intermediate samples of the other independent mono audio channels corresponding in time to said plurality of independent mono audio channels, such that the audio track can be played using an optical disk player and so that in a first mode said audio track including all of the plurality of mono audio channels which have been mixed by summing the plurality of audio channels are played as the stereo recording and in a second mode at least one of the plurality of mono audio channels is unmixed from said audio track by using said restricted set of additional parameters applied in the time domain and the stereo recording played with said mono audio channel removed.

2. The encoder of claim 1, wherein the storage device is an optical disk.

3. The encoder of claim 2, wherein the optical disk is a compact disc storing digital audio data.

4. The encoder of claim 3, wherein the restricted set of additional parameters do not exceed the data size available as sub-code data within the CD+G USER mode.

5. A decoder for reconstructing, in a first mode, a plurality of independent mono audio channels each comprising a first number of samples per unit time, mixed into a summed channel of the a stereo recording by summing the plurality of independent mono audio channels, the summed channels having a second number of samples per unit time that is less than the respective first number of samples per unit time using a restricted set of additional parameters comprising filter parameters retrieved from an audio track of a storage device when reading only the audio stereo recording and the additional parameters from the storage device comprising the summed channel, and in a second mode at least one of the plurality of independent mono audio channels being unmixed and the stereo recording being played with the at least one audio channel removed and not played,
wherein the decoder is arranged to read the audio stereo recording and the additional parameters from the storage device,
wherein the decoder comprises an interpolating filter for reconstructing by interpolation intermediate samples of said plurality of independent mono audio channels using the filter parameters applied in the time domain, and
wherein the decoder is arranged to retrieve samples of the independent mono audio channels by subtracting the calculated intermediate samples from the sum of samples of the summed channel that corresponds in time.

6. The decoder according to claim 5 wherein the reconstructed channels are uncorrelated, and perceptually substantially identical to the original mono channels.

7. The decoder according to claim 5, wherein the restricted set of additional parameters and associated mixing, panning and/or attenuation data provide sufficient information to the decoder, to isolate, remove or attenuate a single or more mono channels during real-time playback.

8. An audio system comprising an encoder according to claim 1 and a decoder according to claim 5.

9. The audio system according to claim 8, wherein the system supports different Audio Configurations or Applications, including (Stereo) Soloist Filtering, (Mono) Vocal and (Mono) Instrument Soloist Filtering, TRUE quadraphonic audio reproduction.

10. The audio system according to claim 8, wherein, when used in a Karaoke application, the lyrics information is included on the storage device, and is in a format such that it can be displayed on a display screen.

11. The audio system according to claim 8, wherein additional audio filter data to improve Time-stretching and/or pitch shifting is included on the storage device.

12. The audio system according to claim 8, wherein when used with Player-Instrument application, the Lead Instrument is filtered from the audio and replaced by a controlled player instrument, where control data is a part of the sub-code data on the storage device.

13. The audio system according to claim 8, wherein a combination of both the Karaoke application and a Player-Instrument application is provided.

14. The audio system according to claim 8, wherein when used in surround audio applications, the decoder is capable of reconstructing the rear stereo audio channels fully isolated from the front stereo channels, from a TRUE quadraphonic encoded storage device.

15. The audio system according to claim 8, wherein when used in surround audio applications, the decoder is capable of dynamically panning the (Mono) Lead Vocal AND/OR (Mono) Lead Instrument from a Karaoke encoded storage device optical disk within the 3D audio space, to reproduce the effect of a live performance where the artist is moving on the stage.

16. The audio system according to claim 8, wherein Midi data is integrated on the storage device.

17. The audio system according to claim 16 further having a timing precision of 272 μsecs per Midi event, as well as a midi velocity resolution of 256 different levels.

18. The audio system according to claim 8 wherein the decoder has means for executing the inverse operation of the encoder and both the decoder and the encoder are implemented in 32 bit integer arithmetic, being independent of floating point implementation.

19. The audio system according to claim 8, wherein the filter parameters are audio filter parameters generated as floating point values first, which are results from optimization with user configurable targets, which may include perceptual audio characteristics.

20. The audio system according to claim 19, further comprising conversion to integer arithmetic, the encoder and/or decoder have means to compensate for rounding and conversion errors as to provide a decoder process which is the inverse operation of encoding.

21. The audio system according to claim 19, wherein said audio filter parameters are regenerated for every time period which is short compared to the audio resolution of the human ear.

22. The audio system according to claim 21, wherein the time period is 40 msecs of audio.

23. The audio system according to claim 8, wherein the encoder incorporates a dynamic compressor which prevents overshoots when mixing and/or encoding the plurality of mono channels into a down-mixed stereo channel.

* * * * *